(12) United States Patent
Dumur et al.

(10) Patent No.: US 12,437,668 B2
(45) Date of Patent: Oct. 7, 2025

(54) ROTORCRAFT FLIGHT TRAINING METHOD, ASSOCIATED SYSTEM AND ROTORCRAFT

(71) Applicants: AIRBUS HELICOPTERS, Marignane (FR); AIRBUS HELICOPTERS DEUTSCHLAND GMBH, Donauwörth (DE)

(72) Inventors: Guillaume Dumur, Salon de Provence (FR); Ivan Chassagne, Franqueville-St-Pierre (FR); Carl Ockier, Augsburg (DE)

(73) Assignees: AIRBUS HELICOPTERS, Marignane (FR); AIRBUS HELICOPTERS DEUTSCHLAND GMBH, Donauwörth (DE)

( * ) Notice: Subject to any disclaimer, the term of this patent is extended or adjusted under 35 U.S.C. 154(b) by 0 days.

(21) Appl. No.: 18/608,145

(22) Filed: Mar. 18, 2024

(65) Prior Publication Data

US 2024/0404424 A1 Dec. 5, 2024

(30) Foreign Application Priority Data

May 31, 2023 (EP) .................................... 23315221

(51) Int. Cl.
*G09B 9/46* (2006.01)
*B64C 27/04* (2006.01)

(52) U.S. Cl.
CPC ................ *G09B 9/46* (2013.01); *B64C 27/04* (2013.01)

(58) Field of Classification Search
CPC ........ G09B 9/46; G09B 9/085; G09B 19/165; B64C 27/04; F05D 2220/329; F02C 9/42; B64D 31/10
See application file for complete search history.

(56) References Cited

U.S. PATENT DOCUMENTS 3,400,471 A * 9/1968 Papin ...................... G09B 9/46
434/33
4,831,567 A 5/1989 Lea
(Continued)

FOREIGN PATENT DOCUMENTS

CA 2452212 C 1/2013
EP 2790170 B1 7/2015
(Continued)

OTHER PUBLICATIONS

European Search Report for European Application No. EP 23315221. 4, Completed by the European Patent Office, Dated Oct. 16, 2023, 15 pages.

*Primary Examiner* — Eddy Saint-Vil
(74) *Attorney, Agent, or Firm* — BROOKS KUSHMAN P.C.

(57) ABSTRACT

A rotorcraft flight training method for a rotorcraft comprising at least two engines and at least one rotor providing lift helping to keep the rotorcraft in the air. The method comprises at least the following steps: flying the rotorcraft in a mode wherein each engine supplies driving power to the rotor; and activating a first command to start a training phase simulating asymmetric flight, the training phase comprising a first flight phase comprising a first control operation, with a controller, controlling the at least two engines and a first display operation for displaying, with a display, information carrying at least two simulated powers.

20 Claims, 3 Drawing Sheets

(56) References Cited

U.S. PATENT DOCUMENTS

| | | | |
|---|---|---|---|
| 5,873,546 A | | 2/1999 | Evans et al. |
| 6,917,908 B2 | | 7/2005 | Williams |
| 9,008,942 B2 | * | 4/2015 | Dyrla ................. B64D 35/023 |
| | | | 701/99 |
| 9,240,126 B2 | * | 1/2016 | Beaud ...................... G09B 9/18 |
| 9,944,388 B2 | * | 4/2018 | Waltner ................ B64C 27/57 |
| 2002/0133322 A1 | | 9/2002 | Williams |
| 2005/0234689 A1 | * | 10/2005 | Gates ...................... G09B 9/46 |
| | | | 703/8 |
| 2013/0219905 A1 | | 8/2013 | Marconi et al. |
| 2014/0302461 A1 | * | 10/2014 | Dumur .................... G09B 9/46 |
| | | | 434/33 |
| 2016/0144971 A1 | * | 5/2016 | Vallart .................. B64D 31/09 |
| | | | 701/3 |
| 2017/0025032 A1 | * | 1/2017 | Dumar .................... G09B 9/44 |
| 2017/0113792 A1 | * | 4/2017 | Vallart ................... B64C 27/57 |
| 2023/0019379 A1 | | 1/2023 | Acee et al. |
| 2024/0386810 A1 | * | 11/2024 | Lemay .................... G09B 9/46 |

FOREIGN PATENT DOCUMENTS

| | | |
|---|---|---|
| EP | 3738888 B1 | 12/2021 |
| EP | 4123623 A1 | 1/2023 |
| FR | 3004164 B1 | 6/2016 |
| WO | 2012059671 A2 | 5/2012 |
| WO | 2012059671 A3 | 7/2012 |

\* cited by examiner

ROTORCRAFT FLIGHT TRAINING METHOD, ASSOCIATED SYSTEM AND ROTORCRAFT

CROSS-REFERENCE TO RELATED APPLICATIONS

This application claims priority to European patent application No. EP23315221.4 filed on May 31, 2023, the disclosure of which is incorporated in its entirety by reference herein.

TECHNICAL FIELD

The present disclosure relates to the field of simulations carried out on board a rotorcraft in order to train a pilot. The present disclosure relates more particularly to a simulation for training a pilot in the event of failure of one of the engines of a multi-engine rotorcraft, and in particular of a twin-engine rotorcraft.

BACKGROUND

An aircraft may comprise at least one rotor. The rotor or rotors are rotated by a power unit. Such a power unit commonly comprises at least two engines, such as turboshaft engines, piston engines or electric motors, in particular. These engines are connected to a power transmission system interposed between the power unit and the components of the rotorcraft that consume mechanical power, in particular the rotor or rotors.

Moreover, the operation of the engines is managed by a control system. This control system makes it possible to implement an engine operating mode commonly referred to as the "All Engines Operating" or AEO mode wherein all of the engines of the power unit are operational and each transmits driving power to the power-consuming components of the rotorcraft such as the rotor or rotors.

In order to reduce the fuel consumption of the aircraft's heat engines, an operating mode referred to as an "economy" operating mode may be used, principally during a cruising flight phase. In this economy operating mode, a single heat engine supplies the power required to rotate the rotor of the aircraft. The other heat engine or engines do not supply significant mechanical power, or indeed do not supply any power. This economy operating mode therefore results in asymmetrical operation of the heat engines, as the heat engines do not operate in an identical manner.

According to a first variant, a single heat engine operates and rotates the rotor of the aircraft on its own. The other heat engine or engines are stopped and are not supplied with fuel. However, in a free turbine turboshaft engine, the rotating members of the gas generator can be kept rotating by an electric motor in order to facilitate and accelerate the restarting of the engine.

According to a second variant, all of the engines are started and supplied with fuel, but only one heat engine supplies significant mechanical power to rotate the rotor or rotors of the aircraft. The other heat engine or heat engines are started, but only operate in a "super-slow" mode and therefore do not supply any mechanical power.

Irrespective of the variant of this economy operating mode, the operation of the heat engines is therefore asymmetrical, as the heat engines do not operate in an identical manner.

Therefore, document EP3738888 discloses a method for operating a rotorcraft comprising a plurality of engines designed to supply driving power to at least one rotor. Document WO2012059671 discloses a method for optimizing specific fuel consumption.

Moreover, an asymmetrical operating mode is implemented wherein at least one first engine is referred to as an "active" engine, i.e., it supplies driving power to at least one rotor, and at least one second engine is referred to as an "inactive" engine, i.e., it supplies substantially no driving power.

This method comprises monitoring for a failure of the active engine. In the event of such a failure, the power output by the inactive engine is automatically increased. The reactivated inactive engine then operates in a "One Engine Inoperative" or OEI mode. An available engine operating in OEI mode supplies power for a predefined period in order to allow the rotorcraft to continue flying temporarily even though one of the engines is unavailable.

During the transitional phase between the failure of the active engine and the reactivation of the inactive engine, the mechanical power transmitted to the rotor or rotors is therefore temporarily zero or greatly reduced and may require the pilot to carry out an autorotation flight phase until the initially inactive engine has become active.

In these conditions, it may be advantageous to train pilots in such a flight sequence.

Pilot training often involves simulations carried out during an actual flight on board a rotorcraft, under the constraints of favorable flight conditions. To this end, the failure of one of the engines may be simulated without rendering the engines ineffective, so that all the engines remain available and can be operated individually in the event that one of them should actually fail. During such a simulation, it is preferable to avoid individual operation of the engines under the constraints imposed by the OEI modes. Indeed, operating an engine in OEI mode places high demands on this engine, resulting in costly maintenance operations.

For this reason, during a simulation, it is common to operate all the engines simultaneously in order to simulate the failure of one of the engines. In the context of a simulated OEI mode that is the focus of the training, the setpoint power to be supplied is, for example, equally distributed between all of the engines that are kept synchronous with the power transmission system.

In this case, each of the engines supplies mechanical power corresponding to the setpoint power divided by the number engines. In this case, each of the engines is running and synchronously connected to the power transmission system. In the event of actual failure of one of the engines, the responsiveness of another engine to supply all of the necessary power is satisfactory. Such simulation methods therefore help preserve the engines when training a pilot for the failure of an engine.

In order to assess known approaches relating to various in-flight simulations of an engine failure in a rotorcraft equipped with several engines, reference can be made, for example, to documents US2005234689 and U.S. Pat. No. 5,873,546. More specifically in relation to the supply of a setpoint power jointly by several engines in the context of an in-flight simulation of a failure of one of the engines, reference can be made to documents U.S. Pat. Nos. 4,831, 567, 6,917,908, CA2452212, FR3004164, US2002/133322 and US20230019379.

SUMMARY

An object of the present disclosure is thus to propose a method for improving the training of rotorcraft pilots in asymmetric flight phases of the power unit. This helps improve safety during such asymmetric flight phases in the event of failure of the active engine.

Another aim of the disclosure is to limit engine damage by avoiding placing stress on the engines in OEI mode.

Lastly, the disclosure enables an instructor to observe the progress in a pilot's training through the simulation of an asymmetric flight phase.

The disclosure relates to a rotorcraft flight training method for a rotorcraft comprising at least two engines and at least one rotor providing lift helping to keep said rotorcraft in the air.

Such a method comprises at least the following steps:

flying the rotorcraft in a mode referred to as AEO mode wherein each of said at least two engines delivers a first driving power P1 to rotate at least said at least one rotor, the first driving power P1 being a minimum power for the rotorcraft to perform a cruising flight phase in the AEO mode;

activating a first command to start a training phase simulating asymmetric flight wherein a first of said at least two engines is configured to supply driving power on its own to said at least one rotor and a second of said at least two engines is configured to supply no driving power to said at least one rotor; and deactivating the first command in order to exit the training phase.

According to the disclosure, such a method is remarkable in that the training phase comprises a first flight phase comprising:

a first control operation, with a controller, controlling said at least two engines to each respectively deliver a second driving power P2 greater than the first driving power P1, the second driving power P2 corresponding to another minimum power in order for the rotorcraft to perform another cruising flight phase during asymmetric flight; and a first display operation for displaying, with a display, information carrying at least two simulated powers that can be delivered respectively by said at least two engines, each of said at least two simulated powers being different from the second driving power.

In other words, such a method can be used to simulate an asymmetric flight phase and at least one transition phase between asymmetric flight and symmetric flight.

Indeed, the first flight phase enables each of said at least two engines to provide the second driving power to said at least one rotor but a display makes it possible to simulate, to at least a pilot, that only the first engine is supplying driving power to said at least one rotor.

Such a display may, for example, comprise a screen for displaying dials, each with a movable pointer or scales, each with a movable index forming the information carrying the at least two simulated powers.

By way of example, the controller may comprise at least one processor and at least one memory, at least one integrated circuit, at least one programmable system, or at least one logic circuit, these examples not limiting the scope to be given to the term "controller". The term "processor" may refer equally to a central processing unit or CPU, a graphics processing unit or GPU, a digital signal processor or DSP, a microcontroller, etc.

The training phase may possibly be initiated by a pilot when the conditions of the rotorcraft are compatible with asymmetric flight.

Such a first flight phase can then be implemented as long as the conditions of this first flight phase remain compatible with asymmetric flight.

Therefore, the transition between asymmetric flight and symmetric flight may be implemented automatically by the method when the conditions of the rotorcraft change, such as, for example, when the height of the rotorcraft from the ground drops below a threshold value, when the forward speed of the rotorcraft is less than a threshold value or when an instantaneous power requirement passes a threshold value.

Moreover, a display displaying the conditions of the rotorcraft may make it possible to indicate to the pilot whether the initial conditions when flying the rotorcraft in the AEO mode are compatible with asymmetric flight.

If this is the case, the first command can be activated by the pilot in order to start an asymmetric flight training phase.

If not, the first command can be inhibited.

Once the pilot's training in asymmetric flight and/or in transition phases is complete, the pilot deactivates the first command in order to exit the training phase.

Advantageously, said at least two simulated powers may comprise a first simulated power and a second simulated power, the first simulated power being displayed as being supplied only by the first engine, the first simulated power being greater than the second driving power during the first flight phase, the second simulated power being displayed as being supplied only by the second engine, the second simulated power being zero during the first flight phase.

In practice, when said at least two simulated powers comprise a first simulated power and a second simulated power, after the first flight phase, the method may comprise activating a second command in order to start a second flight phase for providing flight training for flying the rotorcraft in autorotation, the second flight phase comprising:

a second control operation, with the controller, controlling said at least two engines, the second control operation successively involving:

reducing the driving power supplied respectively by each of said at least two engines from the second driving power to a minimum threshold value less than the first driving power;

keeping the driving power supplied respectively by each of said at least two engines at the minimum threshold value; and increasing the driving power supplied respectively by each of said at least two engines to a maximum threshold value greater than or equal to the first driving power; and a second display operation for displaying, with the display, a reduction in a first current value of the first simulated power simulating a failure of the first engine, then an increase in a second current value of the second simulated power simulating the starting of the second engine.

Therefore, such a method can also be used to simulate a failure of the active engine during simulated asymmetric flight and to train a pilot to perform an autorotation phase wherein the starting of the second engine is simulated. Furthermore, such a second asymmetric flight phase may be relatively long and last between 10 and 15 seconds, or even up to 20 seconds.

Such a simulation is obtained by controlling, with the controller, the driving power that is actually transmitted jointly by the at least two engines.

During this second flight phase, the method therefore makes it possible to simulate a sudden drop in the driving power transmitted to said at least one rotor by the first engine, an absence of driving power transmitted to said at least one rotor, and then a gradual increase in the driving power transmitted to said at least one rotor by the second engine.

Furthermore, the reduction in the driving power supplied respectively by each of said at least two engines may have a predetermined negative rate of variation.

The driving power supplied respectively by each of said at least two engines may be kept at the minimum threshold value Pmin for a predetermined time period by means of a timer device.

The increase in the driving power supplied respectively by each of said at least two engines may have a predetermined positive rate of variation.

Advantageously, after the second flight phase, the method may comprise a third flight phase comprising:
 a third control operation, with the controller, controlling said at least two engines to each respectively deliver the maximum threshold value Pmax; and
 a third display operation for displaying, with said display, the first simulated power as being zero, and the second simulated power as being greater than the second driving power.

In other words, the third flight phase can be used to simulate the operation of the second engine in OEI mode, the setpoint driving power to be supplied to the rotor or rotors then being equally distributed between all of the engines that are kept synchronous with the power transmission system.

The training method according to the disclosure then makes it possible to train a pilot to make a first transition between the AEO mode of the engines and an asymmetric mode, then a second transition between this asymmetric mode and the OEI mode of the second engine.

Moreover, the first command and the second command may be implemented in different ways.

According to a first embodiment, the first command and the second command can be activated and deactivated by a single control member.

For example, such a control member may be formed by a switch or rotary knob.

According to a second embodiment, the first command may be activated and deactivated by first control member, and the second command may be activated and deactivated by a second control member different from the first control member.

In this case, the first control member and the second control member are, for example, bistable buttons that can be actuated one after another.

According to a third embodiment, the first command may be activated by a first control member, the second command may be activated by a second control member different from the first control member, and the first command and the second command may be deactivated by a third control member different from the first control member and the second control member.

In this case, the first control member and the second control member are, for example, monostable buttons arranged on an instrument panel or on a control lever of the rotorcraft.

The third control member is, for example, formed by a monostable switch of the button or trigger type arranged on a control lever of the rotorcraft.

Moreover, the driving power jointly transmitted by the at least two engines may be controlled in different manners.

According to a first variant, the controller can control an engine torque transmitted by each of said at least two engines to a power transmission system for transmitting driving power to said at least one rotor.

In this case, the controller allows the power transmitted to said at least one rotor to be made negligible, while still ensuring minimum power in order to keep the two motors synchronized with the power transmission system, that may comprise a free-wheel.

Desynchronization between a driving part and a driven part of this free-wheel may be avoided by controlling the engine torque to a minimum value close to zero. This control of the transmitted engine torque can be achieved via a dedicated control loop that firstly reduces the engine torque of each engine to a low value in order to decelerate the engines very quickly. When this target value is reached, the deceleration is stopped and the minimum torque value is actively controlled by the torque loop, in order to maintain the minimum torque level during a phase without driving power transmitted to the rotor or rotor, corresponding to part of the second simulated asymmetric flight phase.

According to a second variant, the controller can control a speed of rotation of at least two respective gas generators of each of said at least two engines.

In this case, the controller can be used to adjust the speed of rotation of each gas generator to a target level in order to decelerate the engines very quickly and obtain a phase without driving power transmitted to the rotor or rotors.

Such a target speed of rotation of the gas generators of the engines may be determined by flight tests or bench tests or indeed by simulations.

Depending on this target speed of rotation of the gas generators, the at least two engines will then make it possible to deliver a driving power to said at least one main rotor that is equal to the threshold power during part of the second simulated asymmetric flight phase.

According to a third variant, the controller can control a speed of rotation of at least two input shafts of a main gearbox, each of said at least two input shafts being respectively rotated by said at least two engines.

In this case, the controller can be used to adjust the speed of rotation of each input shaft to a target level in order to decelerate the engines very quickly and obtain a phase without driving power transmitted to the rotor or rotors.

In a similar way as for the gas generator, such a target speed of rotation of the input shafts of the main gearbox may be determined by flight tests or bench tests or indeed by simulations.

Depending on this target speed of rotation of the input shafts of the main gearbox, the at least two engines will then make it possible to deliver a driving power to said at least one main rotor that is equal to the threshold power during part of the second simulated asymmetric flight phase.

The present disclosure also relates to a computer program comprising instructions that, when the program is run, result in the implementation of the flight training method according to the disclosure described above.

The program is, for example, run by a computing device or a computer, comprising at least one processor, at least one integrated circuit, at least one programmable system, at least one logic circuit, and a memory, these examples not limiting the scope given to the expression "computing device" or "computer".

The memory can be used to store the computer program and various information used by the computer program, i.e., the data concerning the driving power to be transmitted to said at least one rotor depending on the different flight phases, models of conditions compatible with asymmetric flight, weather data and environmental data.

The present disclosure also relates to a rotorcraft flight training system for a rotorcraft comprising at least two engines and at least one rotor providing lift helping to keep said rotorcraft in the air.

Furthermore, such a system is remarkable in that it is configured to implement the flight training method according to the disclosure described above, the system comprising the controller and the display.

Such a system is integrated into a rotorcraft and as such constitutes equipment of the rotorcraft. The flight training system can thus be connected to a flight management device of the rotorcraft or to an automatic flight control device of the rotorcraft. Moreover, the simulation of the driving power transmitted to said at least one main rotor may be displayed on a display such as a screen of the rotorcraft, spectacle lenses or the visor of a helmet worn by a pilot.

Lastly, the present disclosure relates to a rotorcraft remarkable in that it comprises a flight training system according to the disclosure described above.

BRIEF DESCRIPTION OF THE DRAWINGS

The disclosure and its advantages appear in greater detail in the context of the following description of embodiments given by way of illustration and with reference to the accompanying figures, wherein.

DETAILED DESCRIPTION

Elements that are present in more than one of the figures are given the same references in each of them.

Figure 1:
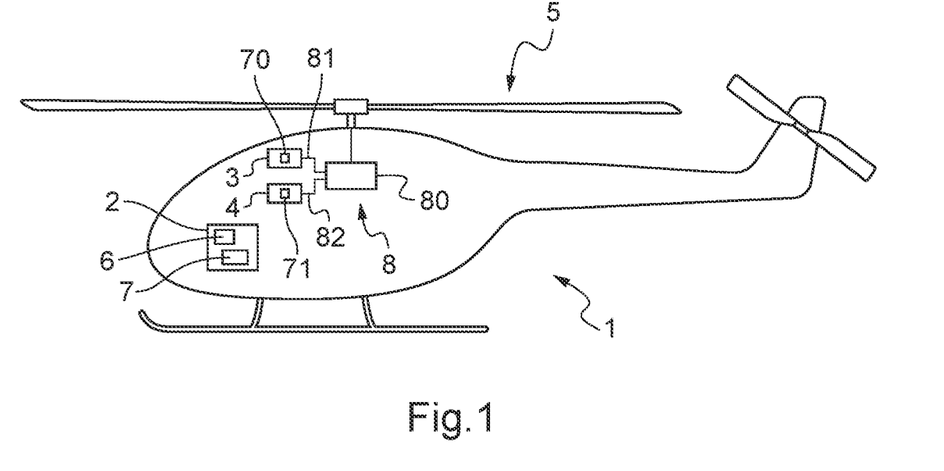
FIG. 1 is a diagram of a rotorcraft according to the disclosure.

As shown in FIG. 1, the disclosure relates to a rotorcraft 1 comprising at least one lift rotor 5 rotated by at least two engines 3, 4 such as turboshaft engines each respectively comprising a gas generator 70, 71 and at least one free power turbine respectively downstream of a gas generator. Each free power turbine is secured to a power shaft capable of being connected to a power transmission system 8.

Furthermore, such a power transmission system 8 allows driving power to be transmitted from the engines 3, 4 to the rotor 5. This power transmission system 8 may in particular comprise a main gearbox 80 and two input shafts 81, 82 cooperating with the main gearbox 80.

Moreover, the rotorcraft 1 is equipped with a flight training system 2. Such a system 2 comprises, in particular, a controller 6 controlling said at least two engines 3, 4 and a display 7 for displaying powers supplied respectively by said at least two engines 3, 4 or for displaying simulated powers capable of being supplied by said at least two engines 3, 4.

The controller 6 may comprise engine computers or indeed a central computer controlling the engine computers. Such a controller also comprises sensing devices and at least one fuel metering valve for controlling said at least two engines 3, 4.

Furthermore, the at least two engines 3, 4 may be controlled in different manners.

Therefore, according to a first embodiment, the controller 6 may control an engine torque transmitted by each of said at least two engines 3, 4 to the power transmission system 8. In this case, the controller 6 comprises torque sensing devices such as torquemeters measuring the engine torque transmitted by each of said at least two engines 3, 4 to the power transmission system 8.

According to a second embodiment, the controller 6 can control a speed of rotation of the at least two respective gas generators 70, 71 of each of said at least two engines 3, 4. In this case, the controller 6 comprises speed sensing devices measuring the speed of rotation of each of said at least two gas generators 70, 71.

According to a third embodiment, the controller 6 can control a speed of rotation of the at least two input shafts 81, 82 of the main gearbox 80. In this case, the controller 6 comprises speed sensing devices measuring the speed of rotation of each of the at least two input shafts 81, 82.

Figure 2:
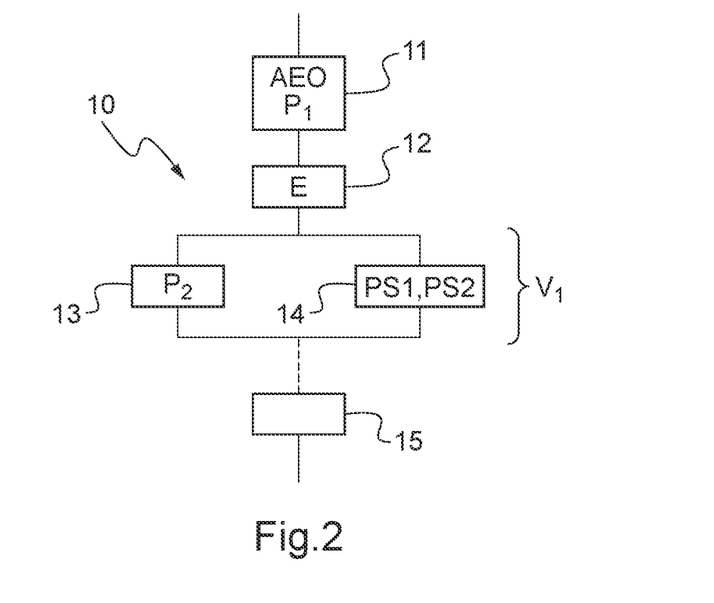
FIG. 2 is a logic diagram showing a first example of a training method according to the disclosure.

Furthermore, as shown in FIG. 2, the disclosure also relates to a method 10 that comprises flying 11 the rotorcraft 1 in an AEO mode wherein each of said at least two engines 3, 4 delivers a first driving power P1 to rotate at least said at least one rotor 5. Therefore, the controller 6 controls the supply of fuel as a function of a setpoint enabling each of said at least two engines 3, 4 to deliver the first driving power P1.

Such a method 10 then comprises activating 12 a first command to start a training phase E simulating asymmetric flight wherein a first engine 3 of said at least two engines 3, 4 is configured to supply driving power on its own to said at least one rotor 5 and a second engine 4 of said at least two engines 3, 4 is configured to supply no driving power to said at least one rotor 5.

The first command thus transmits an analog, digital or optical signal to the controller 6 that performs a first control operation 13 in response. This training phase E therefore comprises a first flight phase V1 comprising the first control operation 13, with the controller 6, controlling said at least two engines 3, 4 to each respectively deliver a second driving power P2 greater than the first driving power P1.

Such a first control operation 13 may, for example, consist in adapting a flow rate of fuel by means of a fuel metering valve upstream of a combustion chamber of each engine 3, 4.

Similarly, the first command transmits an analog, digital or optical signal to the display 7 that performs a first display operation 14 in response. The first flight phase V1 comprises this first display operation 14 for displaying, with the display 7, information carrying at least two simulated powers PS1, PS2 that can be delivered respectively by said at least two engines 3, 4, each of said at least two simulated powers PS1, PS2 being different from the second driving power P2.

Furthermore, said at least two simulated powers PS1, PS2 comprise a first simulated power PS1 and a second simulated power PS2.

The first simulated power PS1 is displayed on the display 7 as being supplied only by the first engine 3, for example via a pointer arranged opposite a dial.

Figure 4:
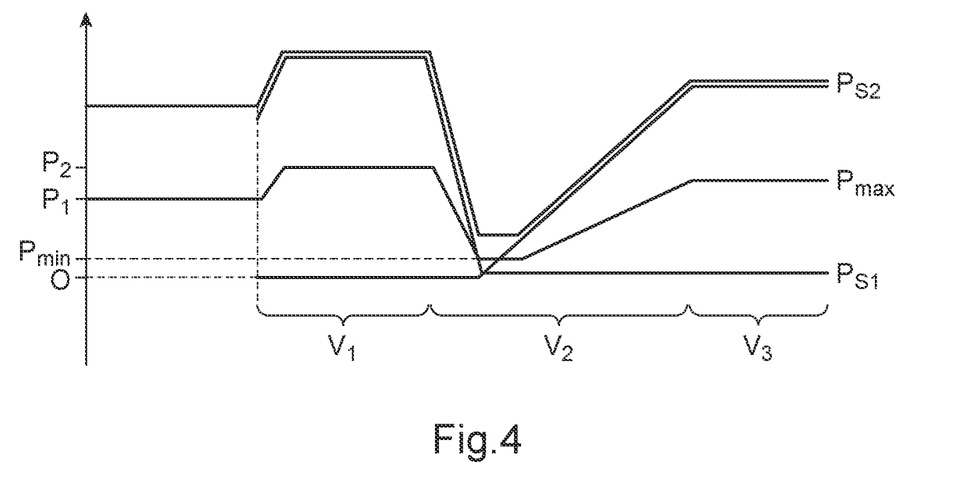
FIG. 4 is a graph showing the powers that are supplied by the at least two engines and the powers that are simulated, according to the disclosure.

As shown in FIG. 4, this first simulated power PS1 is greater than the second driving power P2 during this first flight phase V1. Typically, when the rotorcraft is equipped with two engines, the first simulated power PS1 may be chosen to be equal to double the second driving power P2.

The second simulated power PS2 is displayed as being supplied only by the second engine 4, this second simulated power PS2 being zero during said first flight phase V1.

The method 10 then comprises deactivating 15 the first command in order to exit the training phase E.

Such deactivation 15 may be implemented automatically by the flight training system 2 if it comprises environmental sensing devices measuring the flight conditions of the rotorcraft and when these flight conditions become incompatible with asymmetric flight.

Alternatively, or additionally, the deactivation 15 may also be performed by a control member actuated by a pilot of the rotorcraft when the asymmetric flight training is complete or in the event of an emergency.

Figure 3:
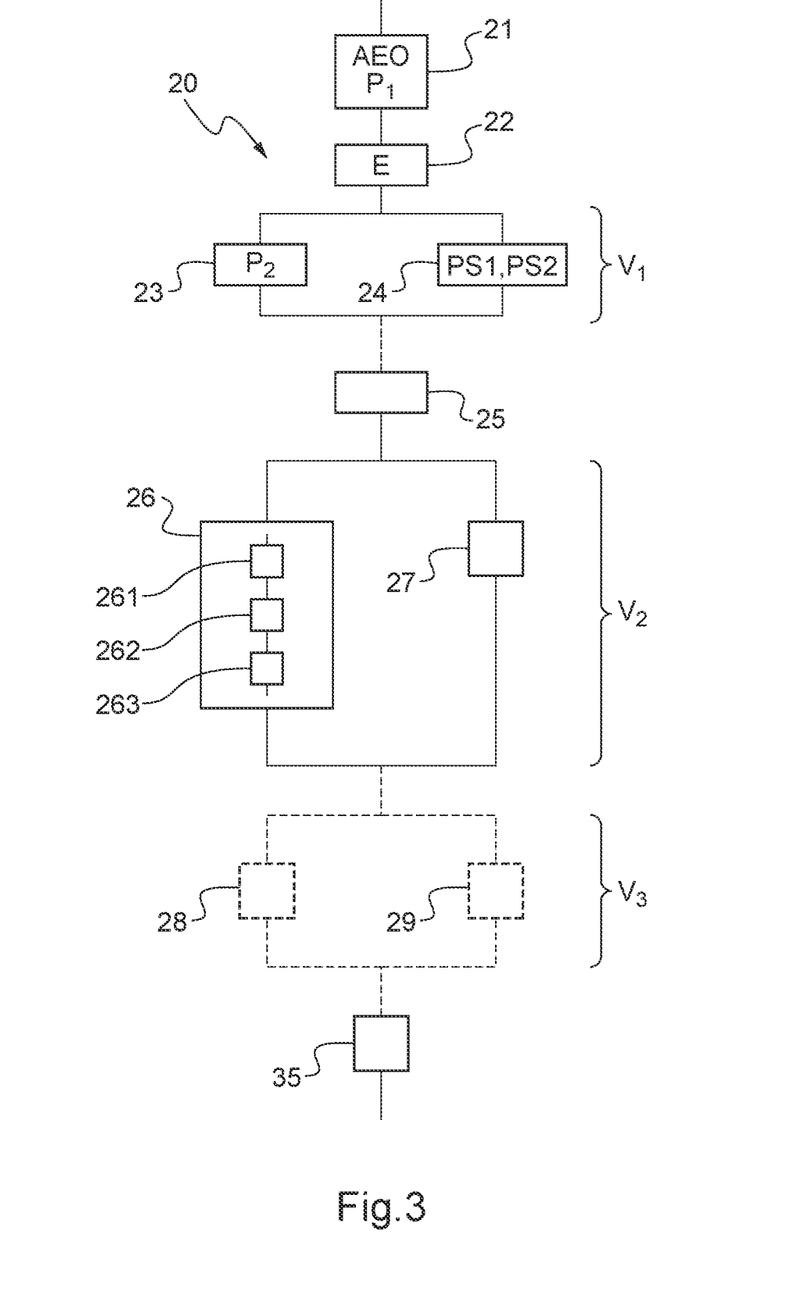
FIG. 3 is a logic diagram showing a second example of a training method according to the disclosure.

The method 20 of FIG. 3 may also comprise the steps of flying 21 the rotorcraft 1 in an AEO mode, activating 22 a first command and then performing the control operation 23 and display operation 24 steps as previously described in FIG. 2 for the method 10.

In addition to these steps, the method 20 then comprises, after the first flight phase V1, activating 25 a second command for starting a second flight phase V2 for providing flight training for flying the rotorcraft 1 in autorotation.

As in the first flight phase V1, the second command thus transmits an analog, digital or optical signal to the controller 6 that performs a second control operation 26 in response, controlling said at least two engines 3, 4.

The second flight phase V2 therefore implements this second control operation 26 with the controller 6.

During such a second control operation 26, the controller 6 controls each engine to successively reduce 261 the driving power supplied respectively by each of said at least two engines 3, 4 from the second driving power P2 to a minimum threshold value Pmin less than the first driving power P1, keep 262 said driving power supplied respectively by each of said at least two engines 3, 4 at the minimum threshold value Pmin, then increase 263 the driving power supplied respectively by each of said at least two engines 3, 4 to a maximum threshold value Pmax greater than or equal to the first driving power P1.

The second flight phase V2 also comprises a second display operation 27 for displaying, with the display 7, a reduction in a first current value of the first simulated power PS1 simulating a failure of the first engine 3, then an increase in a second current value of the second simulated power PS2 simulating the starting of the second engine 4.

Moreover, after the second flight phase V2, the method 20 may possibly comprise a third flight phase V3 comprising a third control operation 28, with the controller 6, that controls said at least two engines 3, 4 so that each engine delivers a power equal to the maximum threshold value Pmax, and a third display operation 29 for displaying, with said display 7, the first simulated power PS1 as being zero, and said second simulated power PS2 as being equal to double the second driving power P2.

The method 20 lastly comprises deactivating 35 the first command in order to exit the training phase E.

As with the deactivation 15, such a deactivation 35 may be implemented automatically by the system 2 and, alternatively, or additionally, it may also be implemented by a control member actuated by a pilot of the rotorcraft.

Figure 5:
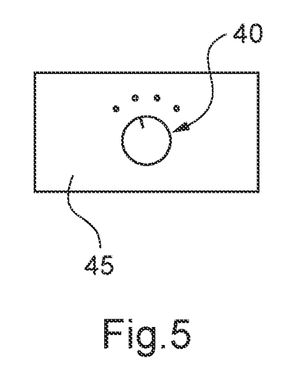
FIG. 5 shows an embodiment of a control member for implementing the method according to the disclosure.

As shown in FIG. 5, the first command and said second command may be activated and deactivated by a single control member 40 shown in the form of a rotary switch with at least three stable positions arranged on an instrument panel 45.

A first position may correspond to the deactivation of the first command, a second position may correspond to the activation of the first command and the deactivation of the second command and a third position may correspond to the activation of the first command and the activation of the second command.

Figure 6:
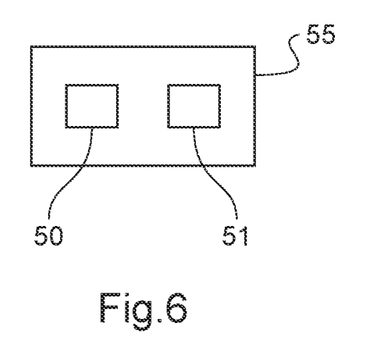
FIG. 6 is an embodiment of two control members for implementing the method according to the disclosure.

According to another example shown in FIG. 6, the first command may be activated and deactivated by a first control member 50, and the second command may be activated and deactivated by a second control member 51 different from the first control member 50.

The first control member 50 and the second control member 51 may then be formed by bistable switches.

A first position of the first control member 50 in relation to an instrument panel 55 may correspond to the deactivation of the first command and a second position of the first control member 50 may correspond to the activation of the first command.

Similarly, a first position of the second control member 51 in relation to an instrument panel 55 may correspond to the deactivation of the second command and a second position of the second control member 51 may correspond to the activation of the second command.

Figure 7:
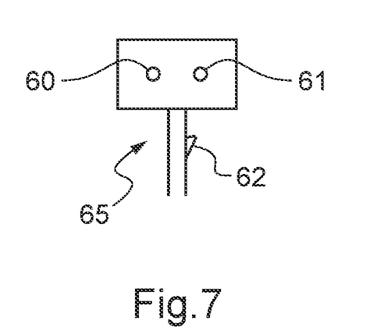
FIG. 7 is an embodiment of three control members for implementing the method according to the disclosure.

Lastly, according to another example shown in FIG. 7, the first command may be activated by a first control member 60 that is movable in relation to a control lever 65, and the second command may be activated by a second control member 61 different from the first control member 60.

Furthermore, the first command and the second command may be deactivated by a third control member 62 that is movable in relation to the control lever 65. Such a third control member 62 may be formed by a trigger and is different from the first control member 60 and the second control member 61.

Naturally, the present disclosure is subject to numerous variations as regards its implementation. Although several embodiments are described above, it should readily be understood that it is not conceivable to identify exhaustively all the possible embodiments. It is naturally possible to envisage replacing any of the means described by equivalent means without going beyond the ambit of the present disclosure.

What is claimed is:

1. A rotorcraft flight training method for a rotorcraft comprising at least two engines and at least one rotor providing lift helping to keep the rotorcraft in the air, the method comprising at least the following steps:
   flying the rotorcraft in an "All Engines Operating" mode (AEO) wherein each of the at least two engines delivers a first driving power (P1) to rotate at least the at least one rotor;
   activating a first command to start a training phase (E) simulating asymmetric flight wherein a first engine of the at least two engines is configured to supply driving power on its own to the at least one rotor and a second engine of the at least two engines is configured to supply no driving power to the at least one rotor; and
   deactivating the first command in order to exit the training phase (E),
   wherein the training phase (E) comprises a first flight phase (V1) comprising:
   a first control operation, with a controller, controlling the at least two engines to each respectively deliver a second driving power (P2) greater than the first driving power (P1), the first driving power (P1) corresponding to a minimum power for the rotorcraft to perform a cruising flight phase in the AEO mode; and a first display operation for displaying, with a display, information carrying at least two simulated powers (PS1, PS2) that can be delivered respectively by the at least two engines, each of the at least two simulated powers (PS1, PS2) being different from the second driving power (P2), the second driving power (P2) corresponding to another minimum power in order for the rotorcraft to perform another cruising flight phase during the simulated asymmetric flight.

2. The method according to claim 1,
wherein the at least two simulated powers (PS1, PS2) comprise a first simulated power (PS1) and a second simulated power (PS2), the first simulated power (PS1) being displayed as being supplied only by the first engine, the first simulated power (PS1) being greater than the second driving power (P2) during the first flight phase (V1), the second simulated power (PS2) being displayed as being supplied only by the second engine, the second simulated power (PS2) being zero during the first flight phase (V1).

3. The method according to claim 1,
wherein, when the at least two simulated powers (PS1, PS2) comprise a first simulated power (PS1) and a second simulated power (PS2), after the first flight phase (V1), the method comprises activating a second command in order to start a second flight phase (V2) for providing flight training for flying the rotorcraft in autorotation, the second flight phase (V2) comprising:

a second control operation, with the controller, controlling the at least two engines, the second control operation successively involving:

reducing the driving power supplied respectively by each of the at least two engines from the second driving power (P2) to a minimum threshold value (Pmin) less than the first driving power (P1);

keeping the driving power supplied respectively by each of the at least two engines at the minimum threshold value (Pmin); and increasing the driving power supplied respectively by each of the at least two engines to a maximum threshold value (Pmax) greater than or equal to the first driving power (P1); and a second display operation for displaying, with the display, a reduction in a first current value of the first simulated power (PS1) simulating a failure of the first engine, then an increase in a second current value of the second simulated power (PS2) simulating the starting of the second engine.

4. The method according to claim 3,
wherein, after the second flight phase (V2), the method comprises a third flight phase (V3) comprising:

a third control operation, with the controller, controlling the at least two engines to each respectively deliver the maximum threshold value (Pmax); and a third display operation for displaying, with the display, the first simulated power (PS1) as being zero, and the second simulated power (PS2) as being greater than the second driving power (P2).

5. The method according to claim 3,
wherein the first command and the second command are activated and deactivated by a single control member.

6. The method according to claim 3,
wherein the first command is activated and deactivated by a first control member, and the second command is activated and deactivated by a second control member different from the first control member.

7. The method according to claim 3,
wherein the first command is activated by a first control member, the second command is activated by a second control member different from the first control member, and the first command and the second command are deactivated by a third control member different from the first control member and second control member.

8. The method according to claim 1,
wherein the controller controls an engine torque transmitted by each of the at least two engines to a power transmission system for transmitting driving power to the at least one rotor.

9. The method according to claim 1,
wherein the controller controls a speed of rotation of at least two respective gas generators of each of the at least two engines.

10. The method according to claim 1,
wherein the controller controls a speed of rotation of at least two input shafts of a main gearbox, each of the at least two input shafts being respectively rotated by the at least two engines.

11. A computer program comprising instructions that, when the program is run, cause the rotorcraft flight training method according to claim 1 to be implemented.

12. A rotorcraft flight training system, wherein the system comprises the controller and the display and is configured to implement the flight training method according to claim 1.

13. A rotorcraft,
wherein the rotorcraft comprises a rotorcraft flight training system according to claim 12.

14. A rotorcraft flight training method for a rotorcraft comprising two engines and a rotor providing lift helping to keep the rotorcraft in the air, the method comprising the following steps:

flying the rotorcraft in an "All Engines Operating" mode (AEO) wherein each of the two engines delivers a first driving power to rotate the rotor;

activating a first command to start a training phase simulating asymmetric flight wherein a first engine of the two engines is configured to supply driving power on its own to the rotor and a second engine of the two engines is configured to supply no driving power to the rotor; and deactivating the first command in order to exit the training phase, wherein the training phase comprises a first flight phase comprising:

a first control operation, with a controller, controlling the two engines to each respectively deliver a second driving power greater than the first driving power, the first driving power corresponding to at least a minimum power for the rotorcraft to perform a cruising flight phase in the AEO mode; and a first display operation for displaying, with a display, information carrying two simulated powers that can be delivered respectively by the two engines, each of the two simulated powers being different from the second driving power, the second driving power corresponding to another minimum power in order for the rotorcraft to perform another cruising flight phase during the simulated asymmetric flight.

15. The method according to claim 14,
wherein the two simulated powers comprise a first simulated power and a second simulated power, the first simulated power being displayed as being supplied only by the first engine, the first simulated power being greater than the second driving power during the first flight phase, the second simulated power being displayed as being supplied only by the second engine, the second simulated power being zero during the first flight phase.

16. The method according to claim 14,
wherein, when the two simulated powers comprise a first simulated power and a second simulated power, after the first flight phase, the method comprises activating a second command in order to start a second flight phase for providing flight training for flying the rotorcraft in autorotation, the second flight phase comprising:
a second control operation, with the controller, controlling the two engines, the second control operation involving:
reducing the driving power supplied respectively by each of the two engines from the second driving power to a minimum threshold value less than the first driving power;
keeping the driving power supplied respectively by each of the two engines at the minimum threshold value; and
increasing the driving power supplied respectively by each of the two engines to a maximum threshold value greater than or equal to the first driving power; and
a second display operation for displaying, with the display, a reduction in a first current value of the first simulated power simulating a failure of the first engine, then an increase in a second current value of the second simulated power simulating the starting of the second engine.

17. The method according to claim 16,
wherein the first command and the second command are activated and deactivated by a single control member.

18. A computer program comprising instructions that, when the program is run, cause the rotorcraft flight training method according to claim 14 to be implemented.

19. A rotorcraft flight training system, wherein the system comprises the controller and the display and is configured to implement the rotorcraft flight training method according to claim 14.

20. A rotorcraft flight training method for a rotorcraft comprising two engines and a rotor, the method comprising:
flying the rotorcraft in an "All Engines Operating" mode (AEO) wherein each of the two engines delivers a first driving power to the rotor;
starting a training phase simulating asymmetric flight wherein a first engine of the two engines is configured to supply driving power on its own to the rotor and a second engine of the two engines is configured to supply less than driving power to the rotor; and
exiting the training phase,
wherein the training phase comprises a first flight phase comprising:
controlling, with a controller, the at two engines to each respectively deliver a second driving power greater than the first driving power, the first driving power corresponding to at least a minimum power for the rotorcraft to perform a cruising flight phase in the AEO mode; and
displaying, with a display, information carrying two simulated powers that can be delivered respectively by the two engines, each of the two simulated powers being different from the second driving power, the second driving power corresponding to another minimum power in order for the rotorcraft to perform another cruising flight phase during the simulated asymmetric flight.

* * * * *